Patented May 7, 1935

2,000,134

UNITED STATES PATENT OFFICE 2,000,134

MANUFACTURE OF HYDROCYANIC ACID

Charles Roberts Harris, Niagara Falls, N. Y., assignor to The E. I. du Pont de Nemours & Company, Incorporated, Wilmington, Del., a corporation of Delaware No Drawing. Application July 21, 1933,
Serial No. 681,565

10 Claims. (Cl. 23—151)

This invention relates to the manufacture of hydrocyanic acid and more particularly to the formation of hydrocyanic acid by reacting ammonia with hydrocarbons.

Heretofore various methods have been proposed for producing hydrocyanic acid by reacting ammonia with hydrocarbons. These methods comprise heating ammonia and the hydrocarbon at high temperatures; e. g., 1100 to 1500° C., with or without the use of a catalyst. Because of the relatively unstable character of hydrocyanic acid and ammonia at the reaction temperature, the rate of gas flow in such processes must be relatively rapid. Furthermore, since the reaction is highly endothermic, successful operation requires rapid rate of heat input. Also, in the absence of a catalyst, the reacting gases must be preheated to relatively high temperatures to initiate the reaction. Heretofore, these processes have had little or no commercial application because of the difficulty of supplying the required large amounts of heat to the reaction vessel at the high temperatures employed, especially when the process is carried out on a large scale. Because of this difficulty in heating, investigators in this art have tended to favor the use of catalysts, since in the presence of a catalyst the reaction generally will occur at a somewhat lower temperature and little or no preheating is required to initiate the reaction. However, the use of a catalyst is attended by certain disadvantages. Catalysts suitable for this type of reaction; e. g., metals of the platinum group, are more or less susceptible to poisoning by impurities in the reaction gases, and hence the raw materials used must be carefully purified before they are brought to the reaction chamber. Also, for some reason not well understood, these catalysts often tend to disintegrate under the reaction conditions. Furthermore, in reactions of this nature, where a hydrocarbon gas is brought to a high temperature, more or less carbon deposition inevitably occurs with a resultant lowering of the catalyst efficiency.

Another proposed method of overcoming the difficulty encountered in supplying the heat required for reacting ammonia with hydrocarbon comprises mixing oxygen or an oxygen-containing gas such as air with the reactants. The partial oxidation produced by the oxygen in the reaction mixture liberates a certain amount of heat, depending upon the proportions used, so that external heating of the catalyst chamber may be reduced to a minimum. That part of the hydrocarbon which is not oxidized is available for the formation of hydrocyanic acid. Water is formed as one of the products of oxidation and this in turn apparently also reacts with some of the hydrocarbon present. This hydrolysis of the hydrocarbon is an endothermic reaction and hence decreases the amount of heat available.

An object of this invention is to provide an improved process for the manufacture of hydrocyanic acid by the reaction of ammonia with hydrocarbon. A further object is to carry out such a reaction in which part or all of the heat is furnished by a simultaneous oxidation reaction in such manner that a larger proportion of the hydrocarbon is available for hydrocyanic acid formation.

These objects are attained in accordance with the present invention by reacting together ammonia, hydrocarbon, oxygen and carbon. By this method, a large part of the heat required is furnished by oxidation of the carbon, thus making available a larger amount of hydrocarbon for hydrocyanic acid formation. Furthermore, since the oxidation of carbon does not form water, hydrolysis of the excess hydrocarbon is correspondingly reduced, thus leaving a further quantity of hydrocarbon available for hydrocyanic acid formation and decreasing the endothermic effect of the hydrolysis.

In addition to serving as a means for producing heat, the carbon acts as a positive means for keeping the reaction going, due to a certain surface effect of the hot carbon particles. Thus, the presence of the carbon introduces some of the advantages of a catalyst, without having the disadvantages thereof.

One method of carrying out my invention comprises preheating a mixture of ammonia, hydrocarbon, and oxygen, preferably to a temperature of 400 to 1000° C. and passing the preheated gas mixture over or through a layer of finely divided carbon in an externally heated reaction chamber while maintaining the maximum temperature therein at 1100 to 1500° C. The temperature in the reaction chamber is controlled by proportioning the amount of oxygen or oxygen-containing gas in the reaction mixture and/or by regulating the heat applied to the reaction chamber. The off-gases, which consist chiefly of hydrocyanic acid, carbon dioxide, carbon monoxide and hydrogen, are cooled, preferably by heat exchange with the incoming reactant gases and the hydrocyanic acid is removed by known means; for example, by cooling to condense the hydrocyanic acid or by absorption in a caustic solution.

My invention may be further illustrated by the following examples:

Example I

A 2-inch layer of wood charcoal composed of particles of 6 to 10 mesh size was supported in a vertical silica tube having an internal diameter of 16 millimeters. Prior to its introduction into the tube, the charcoal was heated to incandescence to drive off volatile matter. The silica tube containing the charcoal was placed in an electric resistance furnace and a mixture of 1 part of ammonia, four parts of natural gas, and fifteen parts of air were passed through the layer of charcoal. The temperature, as measured by a thermocouple embedded in the charcoal layer, was maintained at about 1300° C. by adjusting the electric current applied to the furnace. The length of the heated portion of the tube preceding the carbon layer was such that the incoming gases were heated to 600° or higher before contacting with the carbon. The amount of hydrocyanic acid appearing in the off-gases was determined by absorption in sodium hydroxide and analyzing the resultant solution for cyanide. It was found that 68.4% of the ammonia had reacted to form hydrocyanic acid.

Example II

The procedure described by Example I was carried out, using the same proportions of reacting gases and the same apparatus, except that the reaction temperature was maintained at about 1200° C. In this case, 43% of the ammonia was converted into hydrocyanic acid.

By contrast with Examples I and II, the following example shows that the yield of hydrocyanic acid is decreased when the carbon is omitted.

Example III

A mixture consisting of 1 part of ammonia, four parts of natural gas and 15 parts of air was passed through an empty silica tube of 16 millimeters inside diameter in a furnace which was so regulated that the maximum temperature within the reaction tube was 1200 to 1210° C. Analysis of the off-gas showed that 24.6% of the ammonia had reacted to form hydrocyanic acid.

The proportions of reactants may be varied within wide limits without departing from the scope of my invention. However, the amount of hydrocarbon should be in excess of that required to react with the ammonia. For example, in reacting ammonia with methane, I prefer to pass into the reaction chamber two to five volumes of methane to one volume of ammonia. Other hydrocarbons will be used in stoichiometrically equivalent amounts, based on their respective carbon contents. For example, one volume of ethane or ethylene will be used in place of two volumes of methane; likewise one volume of propylene or propane will be equivalent to three volumes of methane.

The amount of oxygen or oxygen-containing gas employed may be varied, depending upon the amount of heat it is desired to develop by oxidation within the reaction chamber. I prefer to introduce one to three volumes of oxygen, or equivalent amounts of an oxygen-containing gas, e. g. five to fifteen volumes of air, to one volume of ammonia.

While various forms of carbon are suitable for my invention, I prefer to employ a form having a porous structure, for example, wood charcoal.

The gaseous reactants may be mixed prior to their introduction into the reaction chamber, or each may be introduced into the reaction chamber by a separate inlet. Another method comprises first mixing ammonia and hydrocarbon which is introduced into the reaction chamber through one inlet while air or oxygen is introduced through a separate inlet. Since the reaction does not involve the use of catalysts, purification of the reactants is unnecessary; and inexpensive, readily available grades of material may be used. For example, natural gas or vapors obtained by cracking hydrocarbon oils may be used as the source of hydrocarbon. Oxygen may be used as such or oxygen-containing gases; for example, air, may be used. I prefer to use an oxygen-containing gas such as air rather than pure oxygen.

As indicated before, my improved process results in a more economical production of hydrocyanic acid from reactions between ammonia, hydrocarbon and oxidation by making available larger quantities of hydrocarbon for the reaction; this is accomplished by (a) less oxidation of the hydrocarbon and (b) the production of smaller amounts of water, which follows from the decrease in hydrocarbon oxidation. However, water formed by oxidation of hydrogen set free by the reaction between the ammonia and hydrocarbon is also decreased by reason of its reaction with the carbon present at the operating temperature to form carbon monoxide and hydrogen. Hence my method results in a minimum of water vapor in the reaction mixture and the reaction product. This is of advantage not only in increasing the amount of hydrocarbon available for HCN formation but also in decreasing the hydrolysis of the HCN and hence in increasing the yield.

The presence of free carbon in my process results in advantages obtainable by use of a catalyst. It lowers the preheating temperature required to initiate the reaction and acts as a positive means to keep the reaction in progress when fluctuations occur in the temperature or gas composition. On the other hand, the use of carbon has none of the disadvantages attending the use of a metallic catalyst. The action of the carbon is not inhibited by impurities which "poison" metallic catalysts, and is not affected by carbon deposition.

I claim:

1. A process for producing hydrocyanic acid comprising reacting together carbon, ammonia, hydrocarbon and oxygen at a temperature of 1100 to 1500° C.

2. A process for producing hydrocyanic acid comprising reacting together carbon, one volume of ammonia, a hydrocarbon gas equivalent to two to five volumes of methane and one to three volumes of oxygen at a temperature of 1100 to 1500° C.

3. A process for producing hydrocyanic acid comprising contacting a mixture comprising ammonia, hydrocarbon and air with carbon at a temperature of 1100 to 1500° C.

4. A process for producing hydrocyanic acid comprising contacting a mixture comprising ammonia, hydrocarbon and air with wood charcoal at a temperature of 1100 to 1500° C.

5. A process for producing hydrocyanic acid comprising contacting a mixture comprising one volume of ammonia, a hydrocarbon gas equivalent to two to five volumes of methane and five to fifteen volumes of air with carbon at a temperature of 1100 to 1500° C.

6. A process for producing hydrocyanic acid comprising contacting a mixture comprising one volume of ammonia, a hydrocarbon gas equivalent to two to five volumes of methane and five to fifteen volumes of air with wood charcoal at a temperature of 1100 to 1500° C.

7. A process for producing hydrocyanic acid comprising preheating a mixture of ammonia, hydrocarbon and air to a temperature of 400 to 1000° C. and contacting the preheated mixture with carbon at a temperature of 1100 to 1500° C.

8. A process for producing hydrocyanic acid comprising preheating a mixture of ammonia, hydrocarbon and air to a temperature of 400 to 1000° C. and passing the preheated mixture through finely divided wood charcoal at a temperature of 1100 to 1500° C.

9. A process for producing hydrocyanic acid comprising preheating a mixture of one volume of ammonia, a hydrocarbon gas equivalent to two to five volumes of methane and five to fifteen volumes of air to a temperature of 400 to 1000° C. and contacting the preheated mixture with carbon at a temperature of 1100 to 1500° C.

10. A process for producing hydrocyanic acid comprising preheating a mixture of one volume of ammonia, a hydrocarbon gas equivalent to two to five volumes of methane and five to fifteen volumes of air to a temperature of 400 to 1000° C. and passing the preheated mixture through finely divided wood charcoal at a temperature of 1100 to 1500° C.

CHARLES ROBERTS HARRIS.